United States Patent
Beasley et al.

[15] 3,696,734
[45] Oct. 10, 1972

[54] COMMERCIAL WAFFLE BAKER
[72] Inventors: Silas V. Beasley, Elgin, Ill.; Norman Beam, Macon, Mo.
[73] Assignee: McGraw-Edison Company, Elgin, Ill.
[22] Filed: July 8, 1971
[21] Appl. No.: 160,781

[52] U.S. Cl. ..................99/331, 99/375, 99/380
[51] Int. Cl. ...............................................A21b 5/02
[58] Field of Search........99/380, 331, 349, 372, 375, 99/378–379, 381, 426, 428, 439

[56] References Cited
UNITED STATES PATENTS

| | | |
|---|---|---|
| 1,557,009 | 10/1925 | Biebel..................99/380 X |
| 1,742,945 | 1/1930 | Banff......................99/380 |
| 2,230,728 | 2/1941 | Propernick..........99/378 X |
| 3,108,531 | 10/1963 | Jepson et al.............99/331 |
| 3,245,337 | 4/1966 | White et al..............99/331 |
| 3,301,170 | 1/1967 | Beasley....................99/331 |
| 3,384,195 | 5/1968 | Jepson et al.........99/331 X |

FOREIGN PATENTS OR APPLICATIONS

| | | |
|---|---|---|
| 332,487 | 8/1903 | France..................99/372 |
| 933,673 | 1/1948 | France..................99/378 |

*Primary Examiner*—Walter A. Scheel
*Assistant Examiner*—Arthur O. Henderson
*Attorney*—Charles F. Ling

[57] ABSTRACT

A waffle baker where rectangular base and cover case components support circular waffle grids within opposing smooth heated faces defining thereby a heated spill over area annularly adjacent the grids for collecting and solidifying spillage for easy cleaning; where bolts are extended completely through the case component and threaded into taps on the underside of the grid to leave exposed actuating tool heads for easy removal of the bolts and grids without otherwise disassembling the baker; and where a sheath type electric resistance heating element bent to shape is held removably within a fixture and in good heat transfer relationship against the grid underside and a thermostat is spring biased against the grid underside to allow grid removal and replacement without recalibration of the baker.

10 Claims, 4 Drawing Figures

PATENTED OCT 10 1972

Inventors
Silas V. Beasley
Norman A. Beam

By Charles F. Lind
Attorney

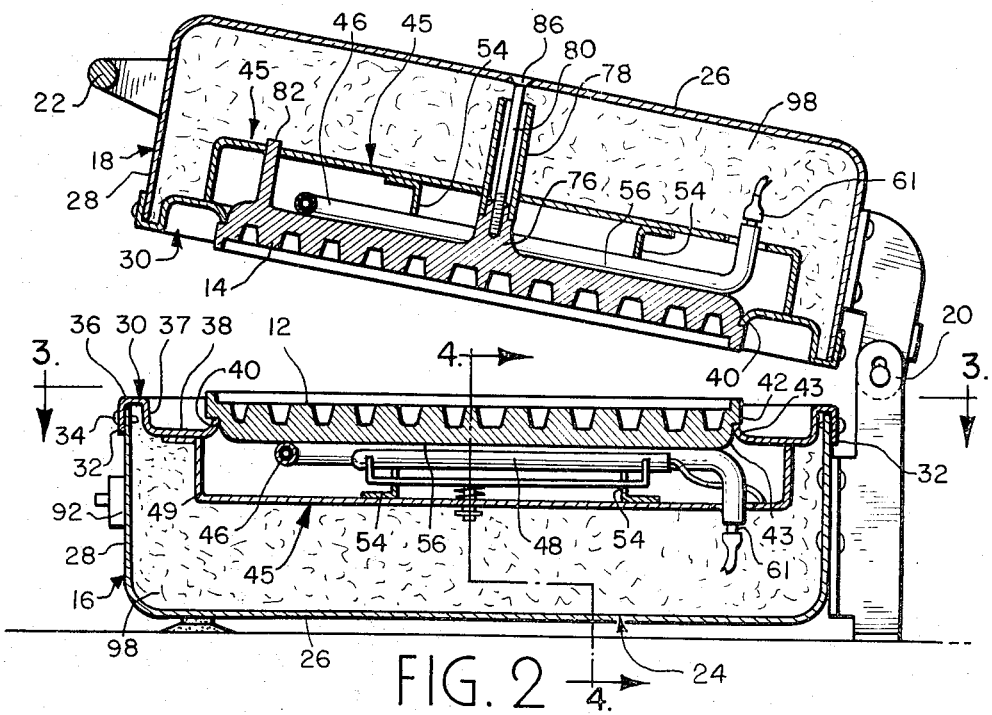
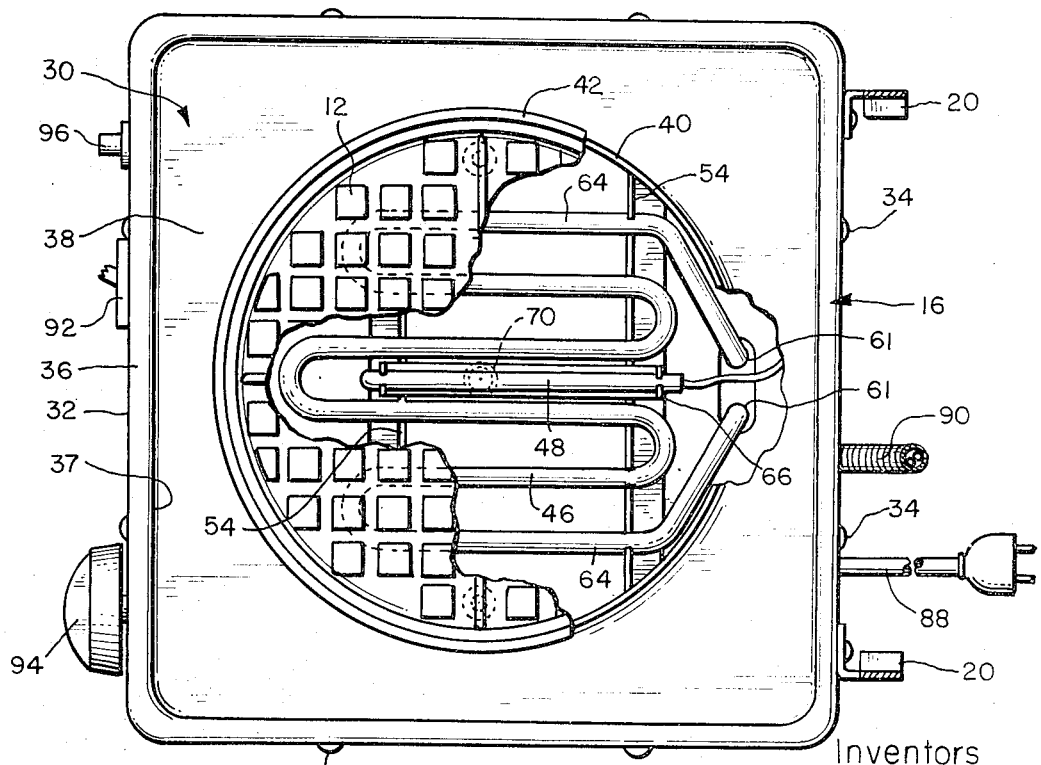

COMMERCIAL WAFFLE BAKER

With waffle bakers used commercially in restaurants or the like it is desirable to provide structure that can be easily cleaned even while the unit is hot since it might be operated continuously for hours at a time. To this end, the subject invention relates to and an object of it is to provide a waffle baker having a heated smooth wall chamber located annularly of the grids for collecting spillage and at least partially baking same so that it can be pealed off with a cooking tool even though the unit is hot. The remaining exterior case portions are sufficiently cool to the touch so that they can be wiped clean with a damp rag or cloth.

Another feature desirable in a commercial waffle baker is that the grids can be easily replaced with new or reconditioned grids by a non-technical operator. Typically the required procedure is set out in the waffle baker manufacture's service manual, but it still must be sufficiently simple and foolproof so as not to cause any change in the color control or other operating characteristic of the unit. To this end, the subject invention also relates to and an object of this invention is to provide an improved grid mounting with bolts that thread into the grid underside from and through the supporting case component so that the bolt head is exposed and away from the grid and the consequent caking up with baked dough and the bolt and grid can be easily removed without further disassembling the unit. Special fixtures hold the thermostat and heating element when the grid is removed so that they automatically assume proper orientation against the replaced grid to maintain designed baking characteristics without baker recalibration.

These and other objects of this invention will be more fully understood and appreciated after referring to the following specification, the accompanying drawings forming a part thereof, wherein:

FIG. 2 is a sectional view as seen generally from line 2—2 in FIG. 1 except showing the cover in a partially raised position;

FIG. 3 is a top plan view as seen generally from line 3—3 in FIG. 2, where part of the structure is broken away for clarity of disclosure.

Figure 1:
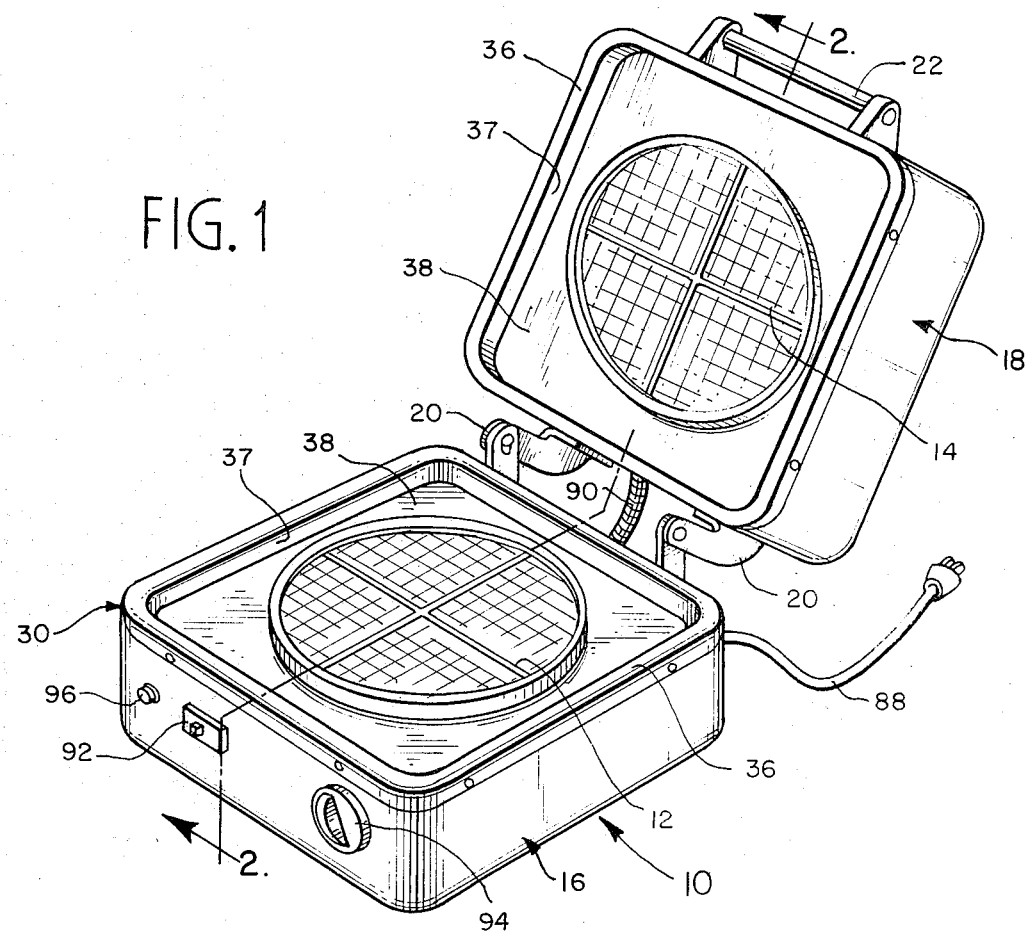
FIG. 1 is a perspective view showing a preferred embodiment of the subject waffle baker in its open position.
Figure 4:
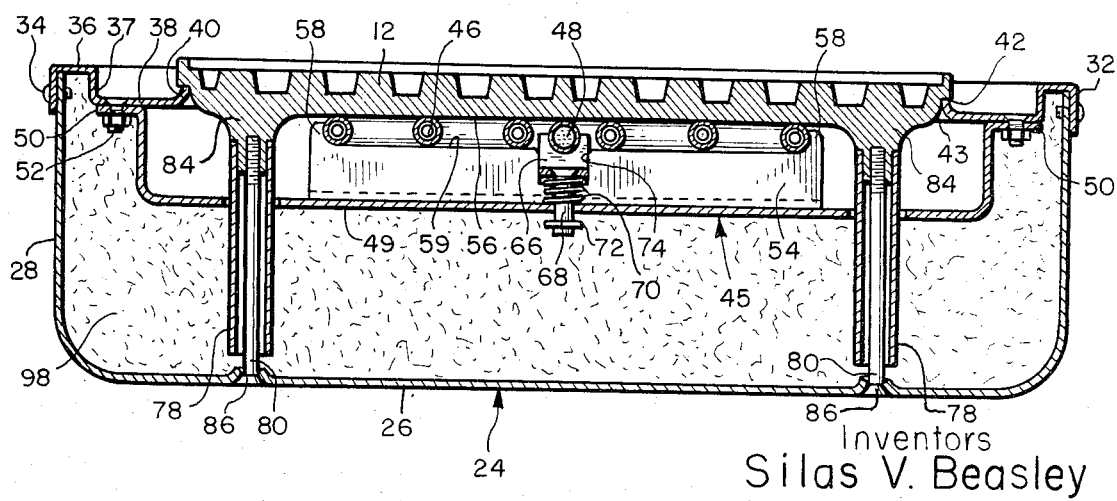
FIG. 4 is a sectional view as seen generally from line 4—4 in FIG. 2.

Referring to FIG. 1, the waffle baker 10 shown has a lower grid 12 and an upper grid 14, each having the typical boss and recess network that imparts the puckered appearance to the waffle. The grids 12 and 14 are supported within sheet metal base and cover case components 16 and 18 respectively, and these are hinged together by a floating pin and slot hinge arrangement 20. This accomodates opening and closing pivotal movement of the cover 18 relative to the base as well as slight separating movement caused by dough expansion when baking between the grids. A handle 22 permits an operator to raise or lower the cover 18 as required.

Each case component is fabricated from a cup-shaped element 24 which has a base wall 26 and opposed pairs of side walls 28. A closure element 30 is positioned across the open end of the element 24 and flange 32 thereon overlaps the side walls 28; screws 34 extending through flange openings for threaded securement to the side walls 28 to hold the closure in place. The closure plate 30 further has inward of the flanges a peripheral rim 36, a web 37, a generally smooth flat face 38 and an upstanding circular lip 40 surrounding a central opening. Each grid has an outwardly flared shoulder 42 which rests on the lip and a rear boss 43 that fits within the central opening with at most nominal clearance. This arrangement of the grid and closure plate when drawn together tightly acts as a seal against spilled dough or the like.

A mounting fixture 45 for heating element 46 and heat sensing bulb 48 is secured to the underside of the closure element 30. Each fixture is formed with a cup-shaped stamping 49 having end flanges 50 that are held against closure plate 30 by nuts threaded onto bolts 52 fixed to the closure plate and extended through flange openings. Spaced angles 54 are secured to each stamping facing the adjacent grid, each angle 54 having its upright leg slightly spaced from the grid underface 56. The leg is notched away and presents opposing shoulders 58 and interconnecting ledge 59, and the heating element 46 is confined between the ledge and the grid underface 56.

Each heating element 46 preferably is an insulated sheath type electric resistance element that is continuous from its end terminals 61 across a three spaced finger or loop configuration for giving wide heating coverage over the grid. The configuration also provides outer legs 64 that are biased by the resilience of the intermediate element curve against the fixture the shoulders 58 so that the element can be easily removed from or installed in the fixture by squeezing the legs together slightly. The upper side of the heating element when confined in the fixture is flush against the grid underface 56 for good heat transfer to the grid.

Only one temperature sensing bulb 48 is used, the same being secured within a generally boxed shaped saddle 66 and located against the lower grid 12. A pin 68 connected to the saddle 66 is extended through an opening in the stamping 49 and a compression spring 70 on the pin in confined between the saddle and the stamping to bias the bulb to good heat sensing relationship against the grid underface 56. Snap washer 72 locked into place on the protruding end of the pin limits upward movement of the pin by engagement against the stamping, such as when the grid is removed. The saddle is guided in recesses 74 in the angle legs during this floating action of the bulb against the grid.

Of importance to the invention, is the manner the grids are drawn tightly against the heating element and temperature sensing bulb and/or can be removed from the case. In this regard, note that the upper grid has a central boss 76 with a tapped opening therein and sleeve 78 is fixed around the boss and projects through an enlarged opening in the fixture stamping 44 to just spaced of the base wall. A screw 80 extends through an opening of the cover base wall and is threaded into the upper grid tap operable to draw the upper grid against the upper heating element 46 and lip 40. The sleeve 78 serves as a guiding means for locating the bolt 80 in the tap. A post 82 on the grid fits within an opening on the fixture to locate the upper grid pattern in proper orientation relative to the lower grid and also to prevent grid rotation. The lower grid 12 has two spaced integral bosses 84 each again having a tapped opening and a surrounding sleeve, where like bolts 80 are inserted through the base and threaded in the grid taps for drawing the grid 12 to the base.

Either grid can be easily removed by simply removing the one bolt on the upper grid 14 or the two bolts on the lower grid 12, and then prying or tapping the grid from the closure with a screw driver or like tool. Since the bolt heads 86 are exposed, no further disassembly of the baker must occur to remove the grids. Moreover the bolt heads are not on the grid face, as has been common, and therefore do not become caked up with baked dough during use. Removal of the grid does not alter the position of the heating element or the thermostat bulb, since each is carried by its mounting fixture and is only in surface contact with the grid even when the latter is assembled.

Electric power is brought into the baker base with cord 88, and cord 90 carries power from the base to the cover for heating the upper element. Other typical controls can include an on-off switch 92, timer 94 with variable zero to four minute settings, and on-off indicator light 96. The thermostat bulb 48 can be of a typical refrigerent pressure system including the bulb and a diaphram where the bulb temperature determines the pressure in the system, and the diaphram responds to actuate a control switch (not shown) located in an appropriate electric circuit between the power cord and the heating elements. Heat insulation 98 is preferably located between the stamping and the base and thereby keeps the case relatively cool to the touch and also separates the appropriate timer and switches previously mentioned from the heating element and at suitably low temperatures.

Regarding the typical operation of the waffle baker, liquid dough is poured or otherwise laddled onto the base grid and the cover grid closed thereagainst. If spillage or overflow does happen it is collected on trough face 38 on the lower casing. When the cover is closed against the base, heat conduction from the heating elements to the trough faces 38, heat the faces sufficiently to define a secondary type baking chamber between the opposed faces 38 and the abutted or almost abutted rims 36. Consequently any spillage confined herein is at least partially baked and solidified so that the operator can pick up the spillage with a fork or other cooking tool even while the baker is in operation and is hot.

What is claimed is:

1. A waffle baker comprising base and cover case components each having an annular closure element with an outer peripheral rim and an inner peripheral lip and a smooth face therebetween, a fixture secured to each closure element on the under side thereof within the respective case component, each said fixture having opposed shoulders and an interconnecting ledge disposed peripherally within the alignment of the lip, a heating element removably supported on each fixture ledge and having a curved intermediate configuration and opposing outer legs where the heating element legs are wedged against the opposing fixture shoulders, a grid adapted to fit into each closure element and against the peripheral lip thereof and against the heating element, means for securing each grid to its case component including a bolt extended through the case component and threaded in a tap on the grid underside, means hinging the case components together where the peripheral rims oppose and abut each other and the smooth faces oppose each other in spaced relation, each face being heated by conduction from the heating element, whereby spillage onto the base case component face is at least partially baked to permit removal thereof with a fork or like cooking tool, a sensing bulb, and means to mount the temperature sensing bulb under a compressive force against and in heat sensing relation to one grid underside.

2. A waffle baker according to claim 1, wherein the heating element curved intermediate configuration includes a plurality of closed loops whereby the opposing legs are the outermost part of the closed loop and are biased apart by the resiliency of the heating element.

3. A waffle baker according to claim 1, wherein the configuration of the cooperating peripheral rims is generally square and where the configuration of the grids is generally circular and whereby each closure element face extends completely around its grid between the rim and the grid.

4. A waffle baker according to claim 1, wherein a sleeve is press fitted or otherwise secured onto the grid underside in spaced concentric relation to the tap therein for guiding the bolt into registry with the grid tap.

5. A waffle baker comprising base and cover case components each having an inner peripheral lip, a fixture secured to each case component, each said fixture having opposed shoulders and an interconnecting ledge disposed peripherally within the alignment of the lip, a heating element removably supported on each fixture ledge and having a curved intermediate configuration and opposing outer legs where the heating element legs are wedged against the opposing fixture shoulders, a grid adapted to fit against the peripheral lip and against the heating element, legs are wedged against the opposing fixture shoulders, a grid adapted to fit against the peripheral lip and against the heating element, means for securing each grid to its case component including a bolt extended through the case component and threaded in a tap on the grid underside, and means hinging the case components together where the grids abut each other.

6. A waffle baker according to claim 5, wherein a sleeve is press fitted or otherwise secured onto the grid underside in spaced concentric relation to the tap therein for guiding the bolt into registry with the grid tap.

7. A waffle baker according to claim 5, further including a temperature sensing bulb, and means carried on the fixture to mount the temperature sensing bulb under a compressive force against and in heat sensing relation to the grid underside.

8. A waffle baker comprising base and cover case components each having an annular closure element with an outer peripheral rim and an inner peripheral lip and a smooth face therebetween, a pair of heating elements and means on each closure element for holding a respective heating element within the case component and the alignment of the lip, a grid adapted to fit against the peripheral lip and against the heating element, means for securing each grid to its case component, and means hinging the case components together where the peripheral rims oppose and abut each other and the smooth faces oppose each other in spaced relation, each face being heated by conduction from the heating element, whereby spillage onto the base case component face is at least partially baked to permit removal thereof with a fork or the like cooking tool.

9. A waffle baker according to claim 8, where the configuration of the cooperating peripheral rim is generally square and where the configuration of the grids is generally circular and whereby each closure element face extends completely around its grid between the rim and the grids.

10. A waffle baker according to claim 1, wherein said means for securing each grid to its case components includes a bolt that is extended through the case component and threaded in a tap on the grid underside, the bolt having its tool actuating head exposes remotely of the grid.

* * * * *